United States Patent
Klemm et al.

(10) Patent No.: US 10,067,675 B2
(45) Date of Patent: Sep. 4, 2018

(54) I/O HANDLING BETWEEN VIRTUALIZATION AND RAID STORAGE

(71) Applicant: Dell International L.L.C., Round Rock, TX (US)

(72) Inventors: Michael J. Klemm, Minnetonka, MN (US); Anthony J. Floeder, St. Anthony, MN (US)

(73) Assignee: Dell International L.L.C., Round Rock, TX (US)

( * ) Notice: Subject to any disclaimer, the term of this patent is extended or adjusted under 35 U.S.C. 154(b) by 0 days.

(21) Appl. No.: 15/416,371

(22) Filed: Jan. 26, 2017

(65) Prior Publication Data
US 2017/0131907 A1    May 11, 2017

Related U.S. Application Data

(63) Continuation of application No. 15/012,078, filed on Feb. 1, 2016, now Pat. No. 9,582,364, which is a continuation of application No. 14/154,393, filed on Jan. 14, 2014, now Pat. No. 9,268,503.

(51) Int. Cl.
*G06F 3/06* (2006.01)

(52) U.S. Cl.
CPC ............ *G06F 3/0604* (2013.01); *G06F 3/061* (2013.01); *G06F 3/064* (2013.01); *G06F 3/0614* (2013.01); *G06F 3/0631* (2013.01); *G06F 3/0653* (2013.01); *G06F 3/0659* (2013.01); *G06F 3/0665* (2013.01); *G06F 3/0685* (2013.01)

(58) Field of Classification Search
CPC .. G06F 11/1096; G06F 3/0619; G06F 3/0665; G06F 3/0689
See application file for complete search history.

(56) References Cited

U.S. PATENT DOCUMENTS

| | | | |
|---|---|---|---|
| 7,613,945 B2 | 11/2009 | Soran et al. | |
| 8,468,292 B2 | 6/2013 | Aszmann et al. | |
| 8,914,576 B2 * | 12/2014 | Pan | G06F 11/108 711/103 |
| 2008/0040553 A1 * | 2/2008 | Ash | G06F 11/1076 711/133 |
| 2011/0258380 A1 * | 10/2011 | Goss | G06F 11/108 711/114 |
| 2013/0254458 A1 | 9/2013 | Pittelko | |

* cited by examiner

*Primary Examiner* — Eric Cardwell
(74) *Attorney, Agent, or Firm* — Winthrop & Weinstine, P.A.

(57) ABSTRACT

A method for handling input/output (I/O) in a data storage system comprising a RAID subsystem storing data according to a RAID level utilizing a parity scheme, where RAID stripes have been configured across a plurality of data storage devices. The method may include monitoring write requests to the RAID subsystem, identifying write requests destined for the same RAID stripe, and bundling the identified write requests for substantially simultaneous execution at the corresponding RAID stripe. Monitoring write requests to the RAID subsystem may include delaying at least some of the write requests to the RAID subsystem so as to build-up a queue of write requests. In some embodiments, identifying write requests and bundling the identified write requests may include identifying and bundling a number of write requests as required to perform a full stripe write to the corresponding RAID stripe.

20 Claims, 3 Drawing Sheets

I/O HANDLING BETWEEN VIRTUALIZATION AND RAID STORAGE

CROSS REFERENCE TO RELATED APPLICATION

This application is a continuation of U.S. application Ser. No. 15/012,078, filed Feb. 1, 2016, which is a continuation of U.S. application Ser. No. 14/154,393, filed Jan. 14, 2014, issued as U.S. Pat. No. 9,268,503, each of which is incorporated herein by reference in its entirety.

FIELD OF THE INVENTION

The present disclosure relates generally to input/output (I/O) handling in a data storage system. Particularly, the present disclosure relates to improved I/O handling between virtualization and RAID storage. Although not so limited, the improved I/O handling of the present disclosure may be particularly advantageous in data storage systems or other information handling systems including Flash based or other solid state storage devices.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Present information handling systems often take advantage of various data storage technologies, such as a redundant array of independent disks (RAID), which is a storage technology combining multiple disk or other drives into a logical storage unit. The use of RAID technology can improve data redundancy and performance. Data may be distributed across the drives in several ways, referred to as RAID levels. The RAID level utilized may depend on the specific level of redundancy and performance required. Each level provides a different balance between reliability, availability, performance, and capacity of the information handling system.

The endeavor for improved performance has led to the increased use of Flash based drives and other solid state devices. Yet, the characteristics of device wear for Flash based drives or other solid state systems (e.g., Flash memory has a relatively limited number of writes before wearing out) is changing the conventional assumptions of RAID levels generally made with respect to spinning disk drives. For example, smaller data allocations may generally be desirable for increasing or maximizing performance. On the other hand, large writes may be more desirable for decreasing or minimizing device wear with respect to solid state or Flash drives.

Some conventional caching technologies attempt to solve a portion of this problem by concatenating multiple writes together. However, there remains a need for further improvement in the performance and durability of information handling systems utilizing or incorporating Flash based or other solid state devices, or generally in the handling of I/O in all information handling systems.

BRIEF SUMMARY OF INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

The present disclosure, in one embodiment, relates to a method for handling input/output (I/O) in a data storage system comprising a RAID subsystem storing data according to a RAID level utilizing a parity scheme, where RAID stripes have been configured across a plurality of data storage devices. The method may include monitoring write requests to the RAID subsystem, identifying write requests destined for the same RAID stripe, and bundling the identified write requests for substantially simultaneous execution at the corresponding RAID stripe. Monitoring write requests to the RAID subsystem may include delaying at least some of the write requests to the RAID subsystem so as to build-up a queue of write requests. Some of the write requests may be released from the queue after a predetermined period of time, regardless of whether they are bundled with other requests, so as not to overly impede system performance. In some embodiments, the data storage system may allocate data space in pages, the pages being smaller in size than the size of a RAID stripe. In more specific embodiments, the pages allocated may be equal in size to a single strip/segment of a RAID stripe, and each write request may correspond to a write to a full page. In still further embodiments, identifying write requests and bundling the identified write requests may include identifying and bundling a number of write requests as required to perform a full stripe write to the corresponding RAID stripe. In other embodiments, however, bundling the identified write requests may include bundling a number of write requests as required to perform a partial stripe write to the corresponding RAID stripe, the partial stripe write comprising substantially simultaneous execution of writes to at least two strips/segments of the corresponding RAID stripe. Suitable page sizes may include 64 KB, 128 KB, or 256 KB; however, other page sizes may be utilized. In some embodiments, the RAID level used may be RAID 5 and/or RAID 6. In still further embodiments, at least some of the data storage devices of the system may be Flash based storage devices, and some of the data storage devices may be disk drives.

The present disclosure, in another embodiment, relates to an information handling system including a data storage system comprising a RAID subsystem storing data according to a RAID level utilizing a parity scheme, where RAID stripes have been configured across a plurality of data storage devices. A controller managing the data storage subsystem may be provided and configured to: monitor write requests to the RAID subsystem, identify write requests destined for the same RAID stripe, and bundle the identified write requests for substantially simultaneous execution at the corresponding RAID stripe. The controller may further be configured to delay at least a portion of the write requests to the RAID subsystem to build-up a queue of write requests for monitoring. The controller may also be configured to release at least some write requests from the queue after a predetermined period of time. In some embodiments, the controller may be configured to identify and bundle a number of write requests as required to perform a full stripe write to the corresponding RAID stripe. At least some of the data storage devices may be Flash based storage devices.

The present disclosure, in yet another embodiment, relates to a method for handling input/output (I/O) in a data storage system comprising a RAID subsystem storing data according to a RAID level utilizing a parity scheme, where RAID stripes have been configured across a plurality of data storage devices. The method may include delaying at least a portion of write requests to the RAID subsystem based on a predetermined protocol for creating a queue of write requests, identifying write requests being made to the same RAID stripe as one another, and bundling the identified write requests for execution at the corresponding RAID stripe so as to require updating parity data for the corresponding RAID stripe only a single time for the bundled write requests. In some embodiments, identifying write requests and bundling the identified write requests may include identifying and bundling a number of write requests as required to perform a full stripe write to the corresponding RAID stripe, and a full stripe write of the corresponding RAID stripe based on the bundled write requests can be completed while avoiding a read of old data and old parity from the corresponding RAID stripe.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

Figure 1:
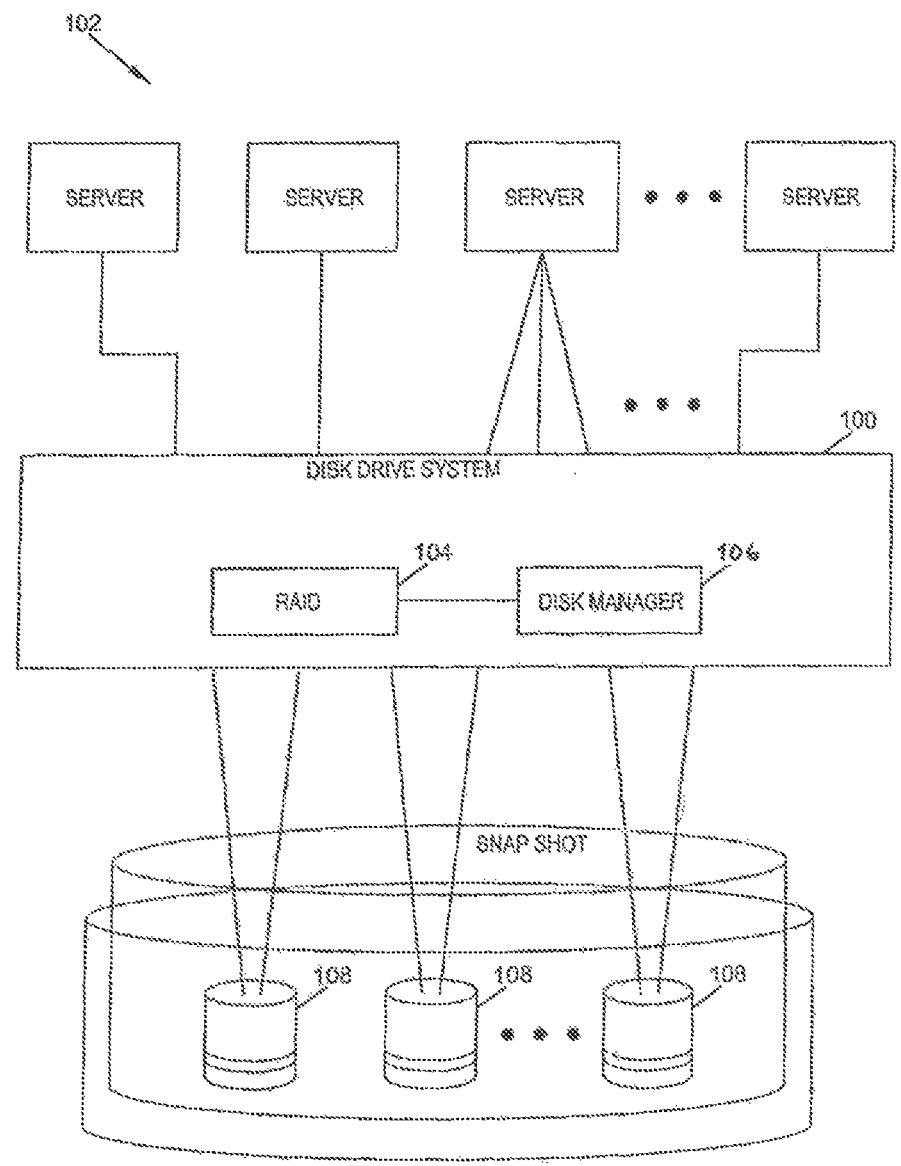
FIG. 1 is a schematic of an information handling system, in the form of a data storage system, suitable for the various embodiments of I/O handling of the present disclosure.

The present disclosure relates generally to novel and advantageous I/O handling in a data storage system. Particularly, the present disclosure relates to novel and advantageous I/O handling between virtualization and RAID storage. As indicated above, although the present disclosure is not so limited, the improved I/O handling of the present disclosure may be particularly advantageous in data storage systems or other information handling systems including Flash based or other solid state storage devices.

For purposes of this disclosure, any system or information handling system described herein may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, a system or any portion thereof may be a personal computer (e.g., desktop or laptop), tablet computer, mobile device (e.g., personal digital assistant (PDA) or smart phone), server (e.g., blade server or rack server), a network storage device, or any other suitable device or combination of devices and may vary in size, shape, performance, functionality, and price. A system may include random access memory (RAM), one or more processing resources such as a central processing unit (CPU) or hardware or software control logic, ROM, and/or other types of nonvolatile memory. Additional components of a system may include one or more disk drives or one or more mass storage devices, one or more network ports for communicating with external devices as well as various input and output (I/O) devices, such as a keyboard, a mouse, touchscreen and/or a video display. Mass storage devices may include, but are not limited to, a hard disk drive, floppy disk drive, CD-ROM drive, smart drive, flash drive, or other types of non-volatile data storage, a plurality of storage devices, or any combination of storage devices. A system may include what is referred to as a user interface, which may generally include a display, mouse or other cursor control device, keyboard, button, touchpad, touch screen, microphone, camera, video recorder, speaker, LED, light, joystick, switch, buzzer, bell, and/or other user input/output device for communicating with one or more users or for entering information into the system. Output devices may include any type of device for presenting information to a user, including but not limited to, a computer monitor, flat-screen display, or other visual display, a printer, and/or speakers or any other device for providing information in audio form, such as a telephone, a plurality of output devices, or any combination of output devices. A system may also include one or more buses operable to transmit communications between the various hardware components.

While the various embodiments are not limited to any particular type of information handling system, the systems and methods of the present disclosure may be particularly useful in the context of a storage center comprising mass storage devices, such as but not limited to disk drive and solid state drive systems, or virtual disk drive systems, such as that described in U.S. Pat. No. 7,613,945, titled "Virtual Disk Drive System and Method," issued Nov. 3, 2009, U.S.

Pat. No. 8,468,292, titled "Solid State Drive Data Storage System and Method," issued Jun. 18, 2013, and U.S. patent application Ser. No. 13/429,511, titled "Single-Level Cell and Multi-Level Cell Hybrid Solid State Drive," filed Mar. 26, 2012, each of which is incorporated by reference herein in its entirety. Such data storage systems allow the efficient storage of data by dynamically allocating user data across a page pool of storage, or a matrix of drive storage blocks, and a plurality of drives based on, for example, RAID-to-disk mapping. In general, dynamic allocation presents a virtual disk or storage device or volume to user servers. To the server, the volume acts the same as conventional storage, such as a disk drive, yet provides a storage abstraction of multiple storage devices, such as RAID (redundant array of independent disks) devices, to create a dynamically sizeable storage device. Data progression may be utilized in such disk drive systems to move data gradually to storage space of appropriate overall cost for the data, depending on, for example but not limited to, the data type or access patterns for the data. In general, data progression may determine the cost of storage in the drive system considering, for example, the monetary cost of the physical storage devices, the efficiency of the physical storage devices, and/or the RAID level of logical storage devices. Based on these determinations, data progression may move data accordingly such that data is stored on the most appropriate cost storage available. In addition, such drive systems may protect data from, for example, system failures or virus attacks by automatically generating and storing snapshots or point-in-time copies of the system or matrix of drive storage blocks at, for example, predetermined time intervals, user configured dynamic time stamps, such as, every few minutes or hours, etc., or at times directed by the server. These time-stamped snapshots permit the recovery of data from a previous point in time prior to the system failure, thereby restoring the system as it existed at that time. These snapshots or point-in-time copies may also be used by the system or system users for other purposes, such as but not limited to, testing, while the main storage can remain operational. Generally, using snapshot capabilities, a user may view the state of a storage system as it existed in a prior point in time.

FIG. 1 illustrates one embodiment of a disk drive or data storage system 100 in an information handling system environment 102, such as that disclosed in U.S. Pat. No. 7,613,945, U.S. Pat. No. 8,468,292, and U.S. patent application Ser. No. 13/429,511, and suitable with the various embodiments of the present disclosure. As shown in FIG. 1, the disk drive system 100 may include a data storage subsystem 104, which may include, but is not limited to, a RAID subsystem, as will be appreciated by those skilled in the art, and a disk or drive manager 106 having at least one disk storage system controller. The data storage subsystem 104 and disk/drive manager 106 can dynamically allocate data across drive space of a plurality of disk drives or other suitable storage devices 108, such as but not limited to optical drives, solid state drives, tape drives, etc., based on, for example, RAID-to-disk mapping or other storage mapping technique. The data storage subsystem 104 may include data storage devices distributed across one or more data sites at one or more physical locations, which may be network connected. Any of the data sites may include original and/or replicated data (e.g., data replicated from any of the other data sites) and data may be exchanged between the data sites as desired.

In the various embodiments of the present disclosure, one or more programs or applications, such as a web browser, and/or other applications may be stored in one or more of the system data storage devices. Programs or applications may be loaded in part or in whole into a main memory or processor during execution by the processor. One or more processors may execute applications or programs to run systems or methods of the present disclosure, or portions thereof, stored as executable programs or program code in the memory, or received from the Internet or other network. Any commercial or freeware web browser or other application capable of retrieving content from a network and displaying pages or screens may be used. In some embodiments, a customized application may be used to access, display, and update information.

Hardware and software components of the present disclosure, as discussed herein, may be integral portions of a single computer or server or may be connected parts of a computer network. The hardware and software components may be located within a single location or, in other embodiments, portions of the hardware and software components may be divided among a plurality of locations and connected directly or through a global computer information network, such as the Internet.

As will be appreciated by one of skill in the art, the various embodiments of the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, middleware, microcode, hardware description languages, etc.), or an embodiment combining software and hardware aspects. Furthermore, embodiments of the present disclosure may take the form of a computer program product on a computer-readable medium or computer-readable storage medium, having computer-executable program code embodied in the medium, that define processes or methods described herein. A processor or processors may perform the necessary tasks defined by the computer-executable program code. Computer-executable program code for carrying out operations of embodiments of the present disclosure may be written in an object oriented, scripted or unscripted programming language such as Java, Perl, PHP, Visual Basic, Smalltalk, C++, or the like. However, the computer program code for carrying out operations of embodiments of the present disclosure may also be written in conventional procedural programming languages, such as the C programming language or similar programming languages. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the context of this document, a computer readable medium may be any medium that can contain, store, communicate, or transport the program for use by or in connection with the systems disclosed herein. The computer-executable program code may be transmitted using any appropriate medium, including but not limited to the Internet, optical fiber cable, radio frequency (RF) signals or other wireless signals, or other mediums. The computer readable medium may be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device. Computer-readable media includes, but is not to be confused with, computer-readable storage medium, which is intended to cover all physical, non-transitory, or similar embodiments of computer-readable media.

Various embodiments of the present disclosure may be described herein with reference to flowchart illustrations and/or block diagrams of methods, apparatus (systems), and computer program products. It is understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks. Alternatively, computer program implemented steps or acts may be combined with operator or human implemented steps or acts in order to carry out an embodiment of the invention.

Additionally, although a flowchart may illustrate a method as a sequential process, many of the operations in the flowcharts illustrated herein can be performed in parallel or concurrently. In addition, the order of the method steps illustrated in a flowchart may be rearranged for some embodiments. Similarly, a method illustrated in a flow chart could have additional steps not included therein or fewer steps than those shown. A method step may correspond to a method, a function, a procedure, a subroutine, a subprogram, etc.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an ingredient or element may still actually contain such item as long as there is generally no measurable effect thereof.

As stated above, in conventional data storage systems, there is a need in the art for improvement in the performance and durability of information handling systems utilizing or incorporating Flash based or other solid state devices, or generally in the handling of I/O in all information handling systems. More specifically, present information handling systems often take advantage of RAID storage technologies, combining multiple disk or other drives into a logical storage unit. Such RAID technology can improve data redundancy and performance by distributing data across the drives in various ways, generally referred to as RAID levels. Many RAID levels, such as RAID 5 and RAID 6, employ an error protection scheme called "parity," which adds fault tolerance for a given set of data. In a conventional parity scheme, the parity data may be calculated by XORing the stored data across all drives in a RAID stripe to generate the corresponding parity data for that stripe. If any drive in the stripe fails, the remaining data and the parity data may be XORed to recover the data from the failed drive. Other parity schemes may be utilized, such as the parity scheme of RAID 6, but generally follow the same concept or attempt to achieve the same result.

During a read-modify-write (or read-create-write) process in a conventional system employing a parity scheme described above, the original data and the corresponding parity data (p) are read from the stripe. The original data and corresponding parity data (p) are XORed to obtain intermediate parity data (p'). The new data is XORed with the intermediate parity data (p') to obtain the new parity ($p_{new}$), and both the new data and the new parity ($p_{new}$) are written to the stripe. In this regard, each time data is written to a drive in the RAID stripe, a new parity is calculated, and both the new data and the new parity are written. That is, the parity is recalculated and rewritten every time there is a write to any portion of the RAID stripe.

In some information handling systems, such as those described above and incorporated by reference, data may be allocated to users of the systems in data chunks referred to herein as pages. For spinning disk drives, relatively small page allocations, resulting in small pages of data divided amongst multiple drives, can reduce read and write performance of the drives. Therefore, in order to improve performance, in some conventional information handling systems, data is allocated in page sizes corresponding to the RAID stripe size (excluding parity data). In this regard, page allocations, page updates, snapshots, and data progression may be performed as full stripe writes, thereby increasing I/O performance and requiring only a single write of the parity data each time the RAID stripe is overwritten.

In other systems, however, smaller data page allocations, such as those less than the RAID stripe size of the system, may generally be desirable for increasing or maximizing performance. Specifically, smaller data page allocations allow further splitting of the I/O amongst the system drives, and may be used to improve system write performance by allocating and updating less drive space at a time.

Figure 2:
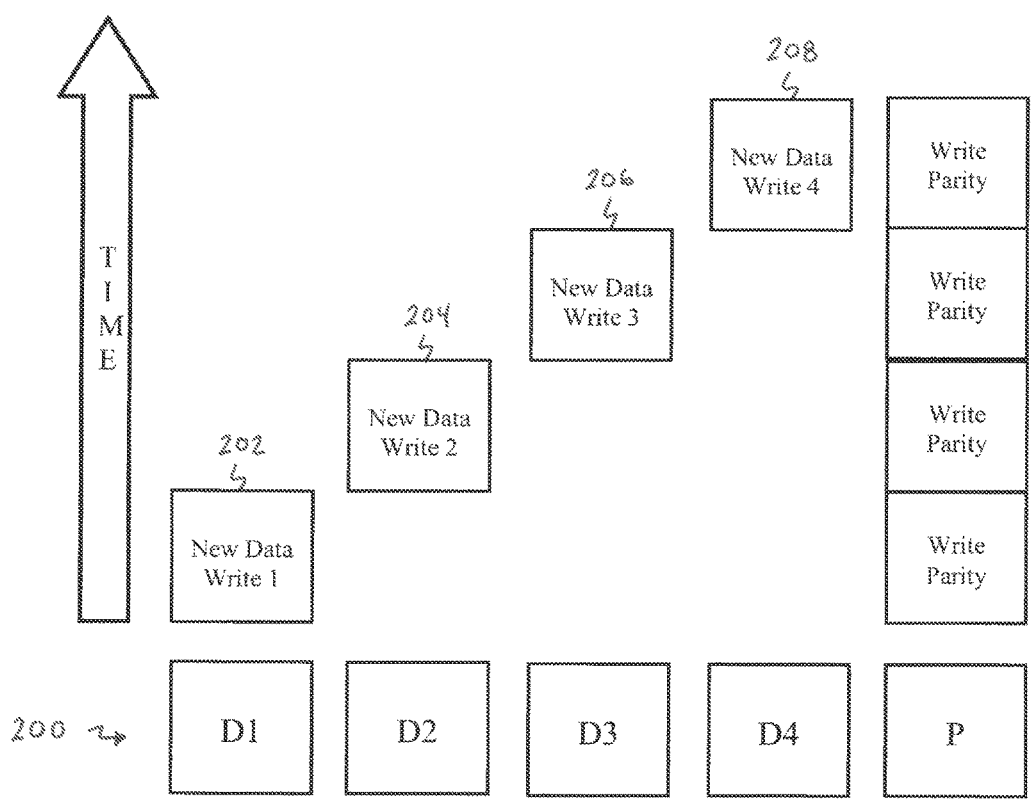
FIG. 2 is a schematic diagram of a conventional, sequential handling of multiple writes to a single RAID stripe.

Utilizing smaller data page allocations, however, presents challenges. For example, an update to just a single page would only update a portion of a RAID stripe, and such partial write stripe would require the read-modify-write process described above, leading to additional I/Os and increasing the number of times the parity data must be calculated and rewritten. For example, FIG. 2 illustrates an example RAID stripe 200, utilizing five drive devices (D1-D4 and P) and employing a parity scheme. FIG. 2 illustrates an example where four separate page writes, one partial stripe write to each data drive of the stripe, are performed sequentially. That is, a partial stripe write of new data 202 to drive D1 is performed first. As indicated above, in a conventional parity scheme, the original data of drive D1 and the corresponding parity data from P are read and XORed to obtain intermediate parity data (p'). The new data 202 is XORed with the intermediate parity data (p') to obtain the new parity ($p_{new}$), and both the new data 202 and the new parity ($p_{new}$) are written to the stripe—the new data 202 to drive D1 and the new parity ($p_{new}$) to drive P. This read-modify-write process results in two reads and two writes, totaling four I/Os. Next, a partial stripe write of new data 204 to drive D2 is performed. Again, the original data of drive D2 and the corresponding parity data from P are read and XORed to obtain intermediate parity data (p'). The new data 204 is XORed with the intermediate parity data (p') to obtain the new parity ($p_{new}$), and both the new data 204 and the new parity ($p_{new}$) are written to the stripe—the new data 204 to drive D2 and the new parity ($p_{new}$) again to drive P. This read-modify-write process again results in two reads and two writes, totaling four additional I/Os. This similar process is repeated for partial stripe writes of new data 206 and 208 to drives D3 and D4, respectively. The four read-modify-write processes result in 16 total I/Os, including four writes alone of the parity data to drive P. Nonetheless, in many cases, particularly for spinning disks, the benefit of smaller data page allocations can outweigh the increase in I/O and parity writes.

As indicated above, however, the endeavor for improved performance has led to the increased use of Flash based drives and other solid state devices. Yet, the characteristics of device wear for Flash based drives or other solid state systems (e.g., Flash memory has a relatively limited number of writes before wearing out) is changing the conventional assumptions of RAID levels generally made with respect to spinning disk drives. More specifically, smaller data page allocations, which can lead to additional I/Os and increased parity writes as described with respect to FIG. 2, may undesirably increase device wear in Flash or other solid state drives.

Accordingly, the present disclosure improves on conventional systems and processes for I/O handling in a data storage system or other information handling system, such as but not limited to the type of data storage systems described in U.S. Pat. No. 7,613,945, U.S. Pat. No. 8,468,292, and U.S. patent application Ser. No. 13/429,511 by bunching or bundling write requests so as to reduce the need to update parity data as often and generally decrease the overall number of I/Os. The disclosed improvements can improve performance and lifetime of Flash based and other solid state drives. However, the benefits of the present disclosure are not so limited. For example, with regard to all types of drives, including non-solid state drives (e.g., spinning disk drives), the embodiments of the present disclosure may reduce the number of I/Os, thereby nonetheless increasing performance of the system.

In general, according to the various embodiments of the present disclosure, the system may be aware of the RAID level(s) spanning the system drives and may build or organize better performing I/O requests to reduce the I/O to the backend drives. More specifically, according to the various embodiments of the present disclosure, write requests may be bunched or bundled together so as to perform full stripe writes, where possible, thereby reducing the need to update parity data as often as would be performed with the individual partial stripe writes. Bundling write requests as full stripe write events can further eliminate the need to perform the read-modify-write process that utilizes previous parity data in order to update the checksum(s), thereby further decreasing the number of I/Os in the system. Even when a full stripe write cannot be performed, bunching or bundling multiple partial stripe writes together to perform larger partial stripe writes in a single operation, can nonetheless decrease the number of times parity data would otherwise need to be updated. In general, the various embodiments of the present disclosure can decrease the number of I/Os, thereby improving drive performance and decreasing the wear of Flash based or other solid state drives.

More specifically, in one embodiment utilizing relatively smaller data page allocations, where RAID stripes are comprised of multiple strips/segments of such smaller data page allocations, it can be desirable to perform full stripe writes, if and where possible. In order to do so, the information handling system may group writes to multiple pages into a single request operation. The grouping of multiple writes may occur at a RAID storage level using a RAID controller with a form of request combining, or may be performed at a system level or a volume level before reaching the RAID controller. Grouping at a volume level could provide benefits in certain situations, but may limit the grouping possibility of page writes to writes for a single volume set.

In order to group multiple write requests, the system could select from multiple page writes "in-flight," or in queue, at a time. To create such a queue or "backlog" of write requests, the system may delay all, or some selection thereof, write requests for a relatively short period of time, while waiting for additional write requests. The waiting period may be any suitable time period, such as but not limited to, some predetermined period of time, or may be a varying period of time, depending, for example, on other circumstances or events, such as the importance/urgency of any particular write request. From the queue or "backlog" of delayed write requests, the system may identify or detect multiple writes for the same RAID stripe. The system may then bundle or group the identified separate writes together, and send a single bundled operation to the RAID stripe for writing. Care may be taken to avoid delaying any given write request for too long, so as to avoid significant drop in system performance. To this end, regardless of whether any given write is able to be grouped with one or more other write requests for a RAID stripe, all or some write requests should nonetheless be passed through and handled within a predetermined, relatively short period of time. That is, in one embodiment, no write request should be held for a relatively unreasonably extended period of time, which could otherwise harm system performance and counter the intended purpose of the various embodiments of the present disclosure. In one embodiment, the system may nonetheless allow a single write request, or a bundled group of write requests that do not yet form a full stripe write, to proceed if a certain, predetermined period of time has passed while being held in the queue.

Figure 3:
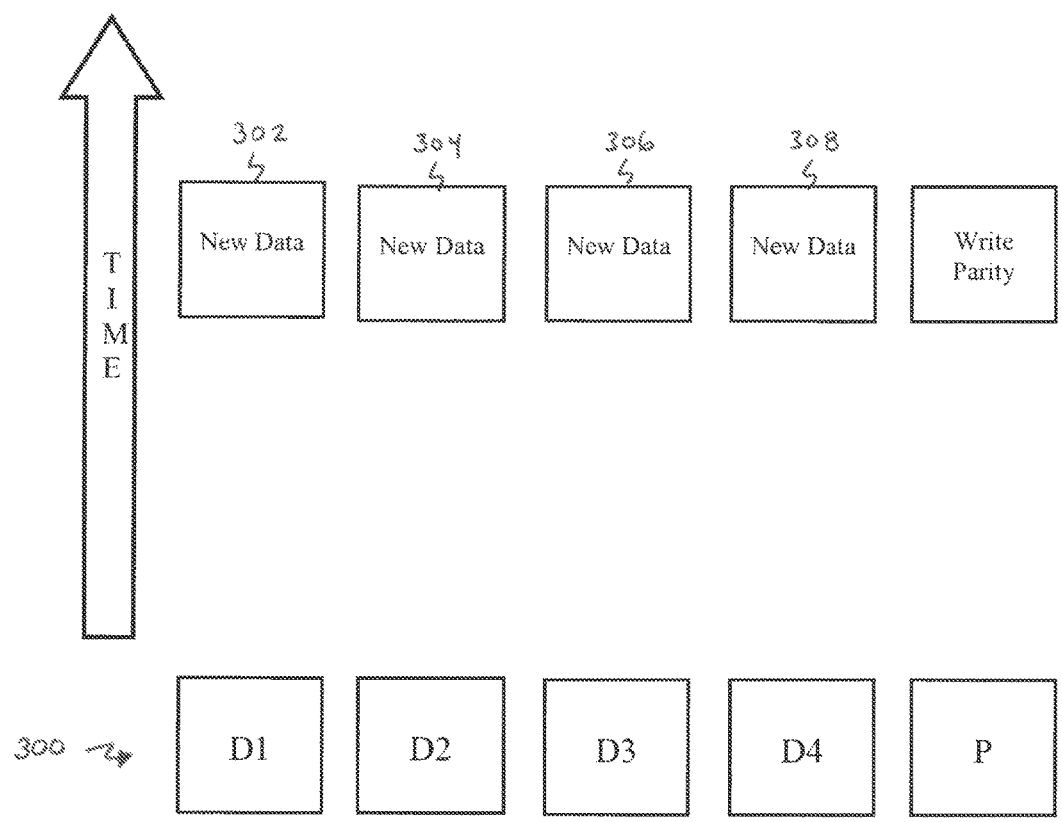
FIG. 3 is a schematic diagram of multiple writes to a single RAID stripe handled according to an embodiment of the present disclosure.

Grouping RAID stripe writes together, to final larger partial stripe writes and, particularly to form full stripe writes, can have the effect of preserving media life of Flash based or other solid state drives by reducing the required number of updates to the parity data. For example, FIG. 3 illustrates an example RAID stripe 300, which similar to that in FIG. 2, utilizes five drive devices (D1-D4 and P) and employs a parity scheme. In FIG. 3, however, four separate page writes, one to each drive of the stripe, are identified and bundled in a single operation for simultaneous handling. According to one embodiment of the present disclosure, to execute the bundled write operations, the read-modify-write process followed with respect to the example of FIG. 2 may be modified so as to first read all the original data of drives D1-D4 and the original parity data (p) from drive P. The original data of drives D1-D4 and the corresponding parity data from P may be XORed to obtain intermediate parity data (p'). The new data 302, 304, 306, and 308 of each write request may then be XORed with the intermediate parity data (p') to obtain the new parity ($p_{new}$), and all the new data 302, 304, 306, and 308 and the new parity ($p_{new}$) may be written to the stripe 300—the new data 302, 304, 306, and 308 to drives D1-D4, respectively, and the new parity ($p_{new}$) to drive P. This read-modify-write process results in a total of 5 reads and 5 writes, totaling 10 I/Os, with only a single update of the parity data. This is a marked improvement over the 16 I/Os required for the conventional read-modify-write process relating to the example of FIG. 2, where four separate page writes, one partial stripe write to each drive of the stripe, are performed sequentially.

In still a further embodiment, where the bundled write requests do, indeed, form a full stripe write, the number of I/Os can be reduced even further. Specifically, where a full stripe write can be performed, the initial reads of the original data, such as the initial data in drives D1-D4 and the parity drive P, can be eliminated. Instead, since the bundled write requests form a full stripe write and will replace all the original data, the initial reads can be bypassed and the new data 302, 304, 306, and 308 can simply be XORed to obtain the new parity ($p_{new}$). Subsequently, all the original data stored in drives D1-D4 and P can be simply overwritten by the new data 302, 304, 306, and 308 and the new parity ($p_{new}$), thereby further reducing the total number of I/Os to 5—one write to each drive D1-D4 and P—a significant improvement over the 16 I/Os described with respect to FIG. 2, where four separate page writes, one partial stripe write to each drive of the stripe, are performed sequentially.

Although illustrated as a bundle of write requests forming a full stripe write, improved I/O handling and performance can be achieved where any two or more write requests are bundled, even if only forming a partial stripe write. For example, if FIG. 3 were modified to eliminate new data 308 from the bundled operation, such that only requests to write new data 302, 304, and 306 were bundled, the corresponding read-modify-write process for the modified bundle would result in a total of 4 reads and 4 writes, totaling 8 I/Os, whereas the conventional, sequential read-modify-write process relating to the example of FIG. 2, if similarly modified to remove the write request relating to new data 208, results in 12 I/Os (i.e., 2 reads and 2 writes for each of the three sequential write operations).

In still further embodiments, other methods of executing write requests and updating parity data may be utilized in conjunction with the various embodiments of the present disclosure, and the various embodiments described herein are not limited to only the examples illustrated. For example, in the case of executing a bundle of write requests forming a partial stripe write, the system may instead complete the I/O requests by reading the non-changing portions of the RAID stripe, calculating the new parity data, and writing the new pages along with the new parity data. The examples illustrated and described herein are intended only to show how the various embodiments of the present disclosure can improve I/O handling, and are not intended to limit the present disclosure to any particular method or order of steps for a given parity update. Instead, an object of the present disclosure is to bundle multiple write requests so as to be written to a RAID stripe during the same operation, thereby reducing the amount of I/O required and the number of times the parity data will be updated.

In one embodiment, the smaller data page size allocated may correspond to, or be generally the same as, the size of one strip or segment of a RAID stripe. In this regard, a RAID stripe may generally be divided into multiple data strips/segments, each equal in size to the data pages allocated by the system of the present disclosure. This configuration helps ensure that I/O within a page is not split between two drives of the RAID stripe and that multiple pages do not fit on a single strip/segment. In other embodiments, data page sizes other than those equal to one strip/segment of a RAID stripe may, however, be utilized, including data page sizes larger than a single strip/segment but smaller than a single RAID stripe, or data page sizes smaller than the size of a RAID strip/segment. However, data page sizes resulting in multiple pages being stored on a single RAID strip/segment may add little benefit, as it is unlikely that adjacent pages within a volume will be on adjacent RAID pages. Some example data page sizes that may be useful for the various embodiments of the present disclosure include, but are not limited to, 64 KB, 128 KB, or 256 KB. However, the invention is not so limited, and any other suitable size data page that is less than the size of a full RAID stripe of the system may be selected.

In some embodiments, the method used by the system for initially allocating data pages to hosts may be modified so as to increase the likelihood that full stripe writes will be formed from queued write requests. Specifically, in one embodiment, through allocation of free data pages, the system may control where any given data page is allocated. In this regard, the system can look for runs of data pages that are in the same RAID stripe and can assign those data pages to a given set of allocation requests received by one or more hosts. Accordingly, the system may allocate data pages to hosts in a manner so as to increase the likelihood that several writes may be queued at around the same time for a given set of data pages, and therefore, the queued writes may be bundled together for completion, as described above, to improve I/O performance.

In further embodiments, the application of bundled write requests may be extended beyond RAID stripes. Specifically, for example, multiple RAID stripes could be allocated in a manner that places them on the same set of drives. A bundled set of write requests, as described above, could thus be performed in a coordinated fashion across two or more RAID stripes. Such extended bundling may be particularly beneficial for spinning disk drives, where the I/O operations per second (IOPS) are generally more expensive. However, placing multiple RAID stripes on the same set of drives may also benefit Flash based or other solid state drives, by reducing wear of the media. Similarly, in embodiments where even large data page allocations (i.e., those the size of full RAID stripes) are utilized, allocating RAID stripes so as to repeat on the same set of drives can provide performance benefits when write requests to those RAID stripes are bundled, as described herein.

In still further embodiments, bundled write requests need not be limited to page boundaries. That is, the write requests need not be limited to page writes and the bundled write requests need not be limited to bundled page writes. Instead, the various embodiments of the present disclosure permit any discontinuous write requests to RAID stripes, including but not limited to page writes, to be bundled or grouped together for better execution or optimization. In general, it permits the system to fill gaps in write requests, where possible, so as to perform performance-optimized full stripe writes, or more complete partial stripe writes, rather than executing singleton write requests.

The various embodiments of the present disclosure are advantageous for a variety of reasons. For example, the various embodiment of the present disclosure can provide more efficient storage space utilization, and particularly in systems utilizing Flash based or other solid state devices, can reduce or minimize wear of the Flash based or other solid state memory, thereby allowing efficient use of such devices in information handling systems well into the future. Furthermore, with respect to non-solid state devices (e.g., spinning disk drives), system performance may be improved simply due to a decrease in I/O. Of course, other advantages of the various embodiments of the present disclosure will be, or become, apparent to those skilled in the art.

For example, the time required to execute I/O may also be reduced. Specifically, when write operations are bundled as described herein, the read I/Os may be sent in parallel and the write I/Os may be sent in parallel. As a result, the latency of the write or read operations is simply/roughly twice the average latency of the corresponding drive device. Contrarily, when the operations are not combined and instead performed serially, the latency of those operations would equal the number of operations multiplied by twice the average latency of the corresponding drive device. As an example, with reference to the example of FIG. 3, where four write operations are bundled, the latency would simply/roughly be twice the average latency of the corresponding drive device, or normalized herein as 2 (e.g., for "twice" the latency). On the other hand, when the write operations are not bundled, as illustrated in FIG. 2, the latency would be roughly eight times the average latency of the corresponding drive (i.e., 4 operations*twice the latency), or normalized herein as 8 (e.g., for eight times the latency), because each operation would be performed serially. Accordingly, not only may the number of I/Os be decreased when bundled, but the total time required for execution of the operations may also be significantly decreased.

In the foregoing description, various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

We claim:

1. A method for handling input/output (I/O) in a data storage system comprising a RAID subsystem storing data according to a RAID level utilizing a parity scheme, where RAID stripes have been configured across a plurality of data storage devices, and where the data storage system allocates data space in data pages, the data pages being smaller in size than the size of a RAID stripe, the method comprising:
monitoring requests for storage space on the RAID subsystem;
where a plurality of data pages are requested for a same host device, allocating to the host device data pages from the RAID subsystem associated with a same RAID stripe;
monitoring write requests to the RAID subsystem to identify write requests for the allocated data pages; and
bundling write requests for the allocated data pages for substantially simultaneous execution at the RAID stripe.

2. The method of claim 1, wherein monitoring write requests to the RAID subsystem comprises identifying write requests to other data pages of the corresponding RAID stripe, the method further comprising bundling the write requests for the allocated data pages with the write requests for the other data pages for substantially simultaneous execution at the RAID stripe.

3. The method of claim 2, wherein bundling the write requests for the allocated data pages with the write requests for the other data pages comprises bundling a number of write requests required to perform a full stripe write to the RAID stripe.

4. The method of claim 2, wherein bundling the write requests for the allocated data pages with the write requests for the other data pages comprises bundling a number of write requests required to perform a partial stripe write to the RAID stripe, the partial stripe write comprising substantially simultaneous execution of writes to at least two strips/segments of the RAID stripe.

5. The method of claim 1, wherein monitoring write requests to the RAID subsystem comprises delaying at least a portion of the write requests to the RAID subsystem to build-up a queue of write requests.

6. The method of claim 5, wherein at least some write requests are released from the queue after a predetermined period of time.

7. The method of claim 1, wherein the allocated data pages are equal in size to a single strip/segment of a RAID stripe, and each write request corresponds to a write to at least a full page.

8. The method of claim 1, wherein the allocated data pages are each at least one of 64 KB, 128 KB, and 256 KB in size.

9. The method of claim 1, wherein the RAID level is at least one of RAID 5 and RAID 6.

10. The method of claim 1, wherein the data storage devices comprise Flash based storage devices.

11. The method of claim 10, wherein the data storage devices further comprise disk drives.

12. The method of claim 1, wherein the bundled write requests comprise new data, the method further comprising:
reading parity data and data from the RAID stripe;
using the parity data and the data, calculating intermediate parity data;
using new data from the bundled write requests and the intermediate parity data to create new parity data; and
writing the new data and the new parity data by executing the bundled write requests at the RAID stripe substantially simultaneously.

13. The method of claim 12, wherein calculating intermediate parity data comprises XORing the parity data and the data from the RAID stripe.

14. The method of claim 13, wherein using new data from the bundled write requests and the intermediate parity data to create new parity data comprises XORing the new data from the bundled write requests with the intermediate parity data.

15. An information handling system comprising:
a data storage system comprising a RAID subsystem storing data according to a RAID level utilizing a parity scheme, where RAID stripes have been configured across a plurality of data storage devices, and where the data storage system allocates data space in data pages, the data pages being smaller in size than the size of a RAID stripe; and
a controller managing the data storage subsystem and configured to:

monitor requests for storage space on the RAID subsystem;

where a plurality of data pages are requested for a same host device, allocate to the host device data pages from the RAID subsystem associated with a same RAID stripe;

monitor write requests to the RAID subsystem to identify write requests for the allocated data pages; and bundle write requests for the allocated data pages for substantially simultaneous execution at the RAID stripe.

16. The information handling system of claim 15, wherein monitoring write requests to the RAID subsystem comprises identifying write requests to other data pages of the RAID stripe, and the controller is further configured to bundle the write requests for the allocated data pages with the write requests for the other data pages for substantially simultaneous execution at the RAID stripe.

17. The information handling system of claim 16, wherein bundling the write requests for the allocated data pages with the write requests for the other data pages comprises bundling a number of write requests required to perform a full stripe write to the RAID stripe.

18. The information handling system of claim 16, wherein the controller is further configured to delay at least a portion of the write requests to the RAID subsystem to build-up a queue of write requests for monitoring.

19. The information handling system of claim 18, wherein the controller is further configured to release at least some write requests from the queue after a predetermined period of time.

20. A method for handling input/output (I/O) in a data storage system comprising a RAID subsystem storing data according to a RAID level utilizing a parity scheme, where RAID stripes have been configured across a plurality of data storage devices, and where the data storage system allocates data space in data pages, the data pages being smaller in size than the size of a RAID stripe, the method comprising:

monitoring requests for storage space on the RAID subsystem to identify a set of storage space requests received from one or more host devices;

assigning data pages from the RAID subsystem that are in a same RAID stripe to the set of storage space requests to increase the likelihood that subsequent write requests to the assigned data pages will be queued around the same time;

monitoring write requests to the RAID subsystem to identify write requests for the assigned data pages; and bundling write requests for the assigned data pages for substantially simultaneous execution at the RAID stripe.

* * * * *